(12) United States Patent
Ohishi et al.

(10) Patent No.: US 9,478,046 B2
(45) Date of Patent: Oct. 25, 2016

(54) IMAGE PROCESSING CIRCUIT AND IMAGE PROCESSING METHOD

(71) Applicant: SAMSUNG DISPLAY CO., LTD., Yongin, Gyeonggi-Do (KR)

(72) Inventors: Hiroshi Ohishi, Yokohama (JP); Seiki Takahashi, Yokohama (JP)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 17 days.

(21) Appl. No.: 14/561,921

(22) Filed: Dec. 5, 2014

(65) Prior Publication Data

US 2015/0161804 A1 Jun. 11, 2015

(30) Foreign Application Priority Data

Dec. 6, 2013 (JP) .................................. 2013-253438

(51) Int. Cl.
*G09G 5/02* (2006.01)
*G09G 5/06* (2006.01)
*G06T 11/00* (2006.01)
*G06T 7/40* (2006.01)
*H04N 1/60* (2006.01)

(52) U.S. Cl.
CPC ............... *G06T 11/001* (2013.01); *G09G 5/06* (2013.01); *H04N 1/6058* (2013.01); *G09G 2340/06* (2013.01)

(58) Field of Classification Search
CPC combination set(s) only.
See application file for complete search history.

(56) References Cited

U.S. PATENT DOCUMENTS

| 8,179,567 | B2 | 5/2012 | Nakamura | |
|---|---|---|---|---|
| 2002/0163669 | A1* | 11/2002 | Yamazaki | H04N 1/6075 358/3.23 |
| 2005/0174440 | A1* | 8/2005 | Kim | H04N 9/643 348/222.1 |
| 2007/0177175 | A1* | 8/2007 | Matsuoka | H04N 1/6005 358/1.9 |
| 2007/0279658 | A1* | 12/2007 | Ito | H04N 1/2307 358/1.9 |
| 2008/0007806 | A1* | 1/2008 | Shirasawa | H04N 1/6058 358/520 |
| 2009/0002783 | A1* | 1/2009 | Hashii | H04N 1/6058 358/520 |
| 2011/0096249 | A1* | 4/2011 | Belik | G09G 3/3413 348/791 |
| 2011/0128438 | A1* | 6/2011 | Yamashita | G06T 1/00 348/384.1 |
| 2013/0271779 | A1* | 10/2013 | Suzuki | H04N 1/6058 358/1.9 |
| 2013/0301065 | A1* | 11/2013 | Nakatani | G06K 15/1878 358/1.9 |
| 2014/0126004 | A1* | 5/2014 | Miyahara | H04N 1/6061 358/1.9 |

FOREIGN PATENT DOCUMENTS

| EP | 1 286 534 B1 | 9/2011 |
|---|---|---|
| JP | 2004-200938 A | 7/2004 |
| JP | 2006-014322 A | 1/2006 |
| JP | 2006-203526 A | 8/2006 |
| JP | 2009-117951 A | 5/2009 |
| JP | 2009-207115 A | 9/2009 |
| JP | 2009-218780 A | 9/2009 |

* cited by examiner

*Primary Examiner* — Wesner Sajous
(74) *Attorney, Agent, or Firm* — Lee & Morse P.C.

(57) ABSTRACT

An image processing device includes a hue changer and a color gamut converter. The hue changer changes a hue of input image data from a first hue to a second hue by combining a phase with a hue of a primary color when the input image data is at or adjacent the primary color, the phase being based on a hue angle phase difference between a first color gamut and a second color gamut narrower than the first color gamut. The color gamut converter preserves a hue about image data from the hue changer and converts a color gamut from the first color gamut to the second color gamut.

13 Claims, 16 Drawing Sheets

FIG. 12

| Algorithm | $L^*m$ | Setting |
|---|---|---|
| Max C | $L^*m1$ | $L^*$ making $C^*$ of gnc maximum on each hue plane |
| Average | $L^*m2$ | Average value of all hue planes of $L^*m1$ obtained every hue plane |
| Horizontal 1 | $L^*m3$ | $L^*$ identical to input color Po |
| Horizontal 2 | $L^*m3$ or $L^*m4$ | $L^* < L^*m4 : L^*m=L^*m3$<br>$L^* >= L^*m4 : L^*m=L^*m4$<br>($L^*m4$: a fixed value when $L^*m$ is great) |
| Horizontal 3 | $L^*m3$ or $L^*m4$ or $L^*m5$ | $0 <= L^* <= L^*m5 : L^*m=L^*m3$<br>$L^*m5 < L^* < L^*m4 : L^*m=L^*m3$<br>$L^*m4 <= L^*  :  L^*m=L^*m4$<br>($L^*m4$: a fixed value when $L^*m$ is small) |

IMAGE PROCESSING CIRCUIT AND IMAGE PROCESSING METHOD

CROSS-REFERENCE TO RELATED APPLICATION

Japanese Application No. 2013-253438, filed on Dec. 6, 2013, in the Japanese Patent Office, and entitled: "Image Processing Circuit and Image Processing Method," is incorporated by reference herein in its entirety.

BACKGROUND

1. Field

Embodiments described herein relate to an image processing device and an image processing method.

2. Description of the Related Art

In a display device, such as a liquid crystal display or an organic EL display, a color gamut area of the display device has been enlarged with advance in a color display technique. In particular, a color gamut area of the liquid crystal display using a light emitting diode (LED) backlight or an organic EL display, an emissive display, may be implemented wider than that of the sRGB (standard RGB) or Adobe RGB as the international standard for conventional color gamut.

With implementation of a color gamut area wider than that of the conventional sRGB or Adobe RGB standard, standardization on the color gamut wider than that of the conventional sRGB or Adobe RGB standard is progressing in the UHDTV (Ultra High Definition Television) standard. For example, the color standard is specified in the ITU-R BT.2020. According to this standard, image contents of a light color gamut based on the UHDTV color standard may be supplied to a display device.

When image contents of a wide color gamut based on the UHDTV color standard are supplied to a display device, a display device that utilizes a color gamut of the sRGB or Adobe RGB standard needs to display image contents of a wider color gamut. Thus, when a signal corresponding to a light color gamut is provided to a display device having a narrow color gamut, converting of a wide color gamut into a narrow color gamut is needed to implement a good expression of the display device.

SUMMARY

One or more embodiments is directed to providing an image processing device that includes a hue changer and a color gamut converter. The hue changer may change a hue of input image data from a first hue to a second hue by combining a phase with a hue of a primary color when the input image data is at or adjacent the primary color, based on a hue angle phase difference between a first color gamut and a second color gamut narrower than the first color gamut. The color gamut converter preserves a hue about image data from the hue changer and converts a color gamut from the first color gamut to the second color gamut.

The hue changer may change the hue of the input image data to combine the phase with the primary color, when a hue angle of an input color of the input image data is adjacent the primary color of a color gamut having a first range.

The color gamut converter may convert the color gamut depending on first information about a boundary area of the first color gamut and second information about a boundary area of the second color gamut.

The color gamut converter may convert the color gamut depending on a line connecting a reference point and a point after the hue changing unit changes the phase, and on intersection points of a boundary area of the first color gamut and a boundary area of the second color gamut.

The image processing device may further include a color space converter to perform conversion from a first color space to a second color space of the input image data where the first color space is designated.

The hue changer may combine the phase with a hue of the primary color in the second color space.

The first color space may be an RGB color space.

The second color space may be a CIELAB color space.

The image processing device may further include a color space re-converter to perform conversion from the second color space to the first color space with respect to image data output from the color gamut converter.

One or more embodiments is directed to providing an image processing method that includes changing a hue of input image data from a first hue to a second hue by combining a phase with a hue of a primary color when the input image data is at or adjacent the primary color, in accordance with a hue angle phase difference between a first color gamut and a second color gamut narrower than the first color gamut, and preserving a hue about image data from the hue changing unit and converting a color gamut from the first color gamut to the second color gamut.

BRIEF DESCRIPTION OF THE DRAWINGS

Features will become apparent to those of skill in the art by describing in detail exemplary embodiments with reference to the attached drawings in which:

FIG. 12 illustrates a diagram for describing algorithm for determining a reference point on an L* axis;

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1:
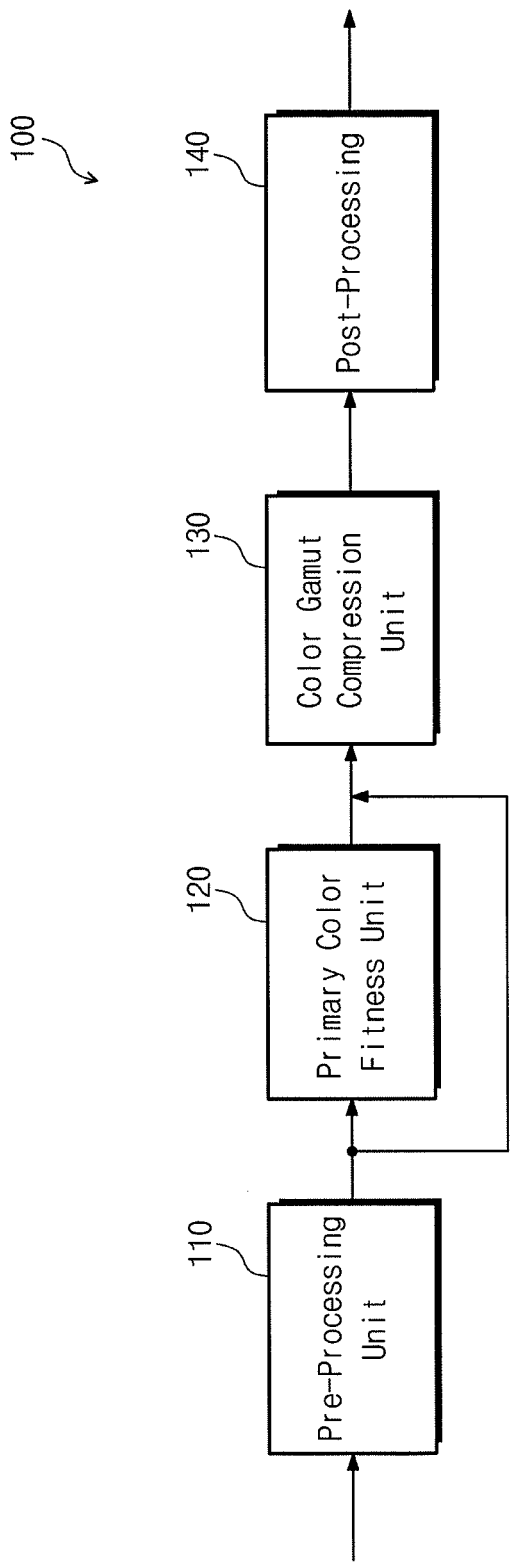
FIG. 1 illustrates a configuration of an image processing device according to an embodiment.

FIG. 1 is a diagram showing a configuration of an image processing device according to an embodiment. Referring to FIG. 1, an image processing device 100 according to an embodiment compresses a color gamut of input image data in compliance with a hue-preserving and gamut-compressing manner where a hue is preserved and a color gamut is converted.

For example, the image processing device 100 converts image data of a color gamut, which is based on the UHDTV color standard, into image data of which the color gamut is based on the sRGB standard having a color gamut narrower than a color gamut based on the UHDTV color standard.

Below, a color gamut of image data provided to the image processing device 100 is referred to as "wide color gamut", and a color gamut of image data output from the image processing device 100 is referred to as "narrow color gamut".

The image processing device 100 may include a pre-processing unit 110, a primary color fitness unit 120, a color gamut compression unit 130, and a post-processing unit 140.

The pre-processing unit 110 pre-processes image data input in the image processing device 100. The image data input in the image processing device 100 is referred to as "input image data".

The pre-processing unit 110 conducts the following: inverse gamma converting, converting color space, and calculating hue angle of input color. A configuration of the pre-processing unit 110 will be more fully described below.

The pre-processing unit 110 provides the pre-processed image data to the primary color fitness unit 120 and the color gamut compression unit 130. The image data pre-processed by the pre-processing unit 110 is referred to as "pre-processed image data".

When a color of the input image data is adjacent to a primary color, the primary color fitness unit 120 combines a hue of the pre-processed image data with a phase of a primary color of a narrow color gamut.

Below, processing of the primary color fitness unit 120 is referred to as "phase adjusting". Image data experiencing the phase adjusting is referred to as "phase-adjusted image data". A configuration of the primary color fitness unit 120 will be more fully described below.

The primary color fitness unit 120 provides the color gamut compression unit 130 with the phase-adjusted image data.

The color gamut compression unit 130 compresses a color gamut of the phase-adjusted image data. The color gamut compression unit 130 provides the post-processing unit 140 with image data of which the color gamut is compressed. The image data of which the color gamut is compressed is referred to as "gamut-compressed image data". The gamut-compressed image data is provided to the post-processing unit 140.

The post-processing unit 140 post-processes the gamut-compressed image data. The post-processing unit 140 converts a color space and perform inverse gamma converting. A detailed configuration of the post-processing unit 140 will be more fully described later.

The image processing device 100 according to an embodiment compresses a color gamut of image data received according to the hue-preserving and gamut-compressing manner and reduces a shift or deviation of a hue at a primary color and a neighborhood of the primary color due to gamut compression.

Figure 2:
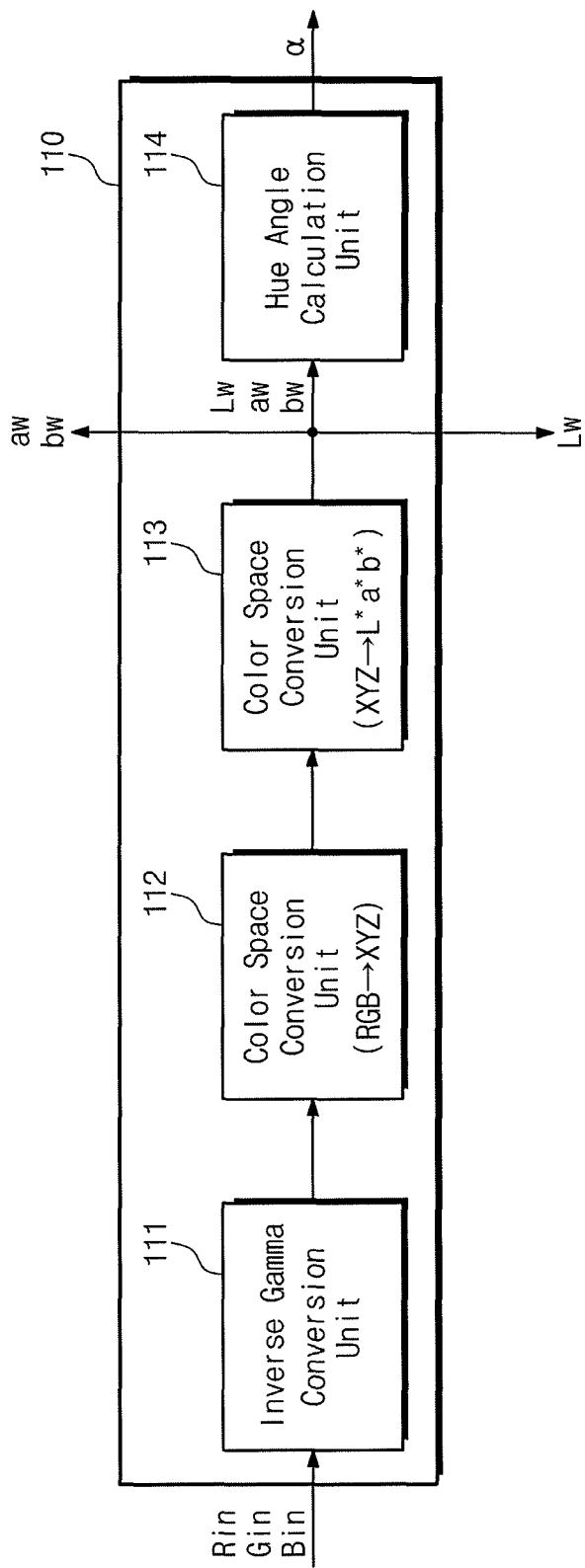
FIG. 2 illustrates a configuration of a pre-processing unit shown in FIG. 1.

FIG. 2 is a diagram showing a configuration of the pre-processing unit 110 shown in FIG. 1. Referring to FIG. 2, the pre-processing unit 110 may include an inverse gamma conversion unit 111, color space conversion units 112 and 113, and a hue angle calculation unit 114.

The inverse gamma conversion unit 111 performs inverse gamma correcting input color signals, e.g., red, green, and blue signals Rin, Gin, and Bin, of input image data of a wide color gamut, here having an RGB color space. In particular, the inverse gamma conversion unit 111 linearizes each of the red, green, and blue signals Rin, Gin, and Bin of the input image data of the wide color gamut. Such linearization may include raising each input color signal by 2.2 to the second power. The inverse gamma conversion unit 111 provides the color space conversion unit 112 with the input image data of the wide color gamut thus linearized.

The color space conversion unit 112 converts a color space of the input image data of the wide color gamut thus linearized from the RGB color space to an XYX color space. The color space conversion unit 112 provides the color space conversion unit 113 with X, Y, and Z signals Xw, Yw, and Zw of the input image data of the wide color gamut converted into the XYZ color space.

The color space conversion unit 113 converts a color space of the input image data of the wide color gamut, converted into the XYZ color space, from the XYZ color space to an L*a*b* color space, where L is lightness, and a (red/green) and b (yellow/blue) are color-opponent dimensions in a CIELAB color space. A hue-preserving and gamut-compressing manner is a manner where a color gamut is compressed with a hue preserved, and compressing of a color gamut has to be performed with respect to the same hue.

Thus, the hue-preserving and gamut-compressing manner is a manner where a color gamut is compressed in the L*a*b* color space. Therefore, the color space conversion unit 113 previously converts a color space of the input image data of the wide color gamut into the L*a*b* color space.

The color space conversion unit 113 provides the hue angle calculation unit 114 with L*, a*, and b* signals Lw, aw, and bw of the input image data of the wide color gamut converted into the L*a*b* color space. Also, the color space conversion unit 113 provides the a* and b* signals aw and bw of the input image data to the primary color fitness unit 120 and the L* signal Lw to a color gamut compression unit 130.

The hue angle calculation unit 114 calculates a hue angle α of the input image data of the wide color gamut converted into the L*a*b* color space by the color space conversion unit 113. The hue angle calculation unit 114 calculates the hue angle α using the equation α=a tan 2(b*, a*). The hue angle calculation unit 114 provides the calculated hue angle α to the primary color fitness unit 120.

Figure 3:
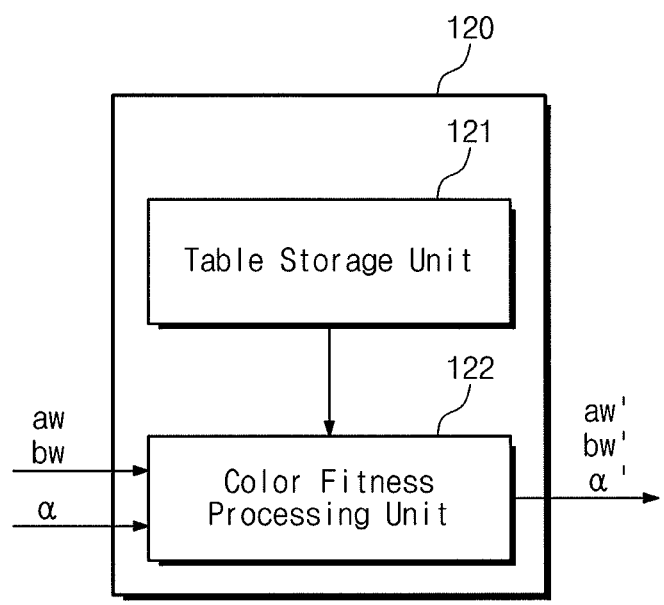
FIG. 3 illustrates a configuration of a primary color fitness unit shown in FIG. 1.

FIG. 3 is a diagram showing a configuration of a primary color fitness unit shown in FIG. 1. Referring to FIG. 3, a primary color fitness unit 120 contains a table storage unit 121 and a color fitness processing unit 122.

The table storage unit 121 contains a table that is used for phase adjusting to be performed in a color fitness processing unit 122. In particular, the table storage unit 121 indexes a relationship between a phase difference, which is between a hue angle of a primary color of a wide color gamut and a hue angle of a primary color of a narrow color gamut in an L*a*b* space, and a value on an L* axis, and stores the indexed result in the form of table.

Values corresponding to phase differences between hue angles of a primary color of a wide color gamut and hue angles of a primary color of a narrow color gamut in the L*a*b* space are previously calculated and then are stored in the form of table. Thus, when a value on the L* axis is determined, a phase difference between a hue angle of a primary color of a wide color gamut and a hue angle of a primary color of a narrow color gamut is obtained from the table of the stable storage unit 121.

The color fitness processing unit 122 performs phase adjusting about a* and b* signals aw and bw provided from a color space conversion unit 113, depending on a hue angle α of image data from the hue angle calculation unit 114 and data of the table in the table stage unit 121.

In particular, when a hue angle α of image data from the hue angle calculation unit 114 is adjacent to a hue angle of a primary color of a wide color gamut, the color fitness processing unit 122 performs phase adjusting about a* and b* signals aw and bw provided from the color space conversion unit 113. The color fitness processing unit 122 provides a color gamut compression unit 130 with signals aw' and bw', experiencing the phase adjusting, and a hue angle α' after the phase adjusting by the color fitness processing unit 122. This will be described in further detail below in connection with FIG. 11.

Figure 4:
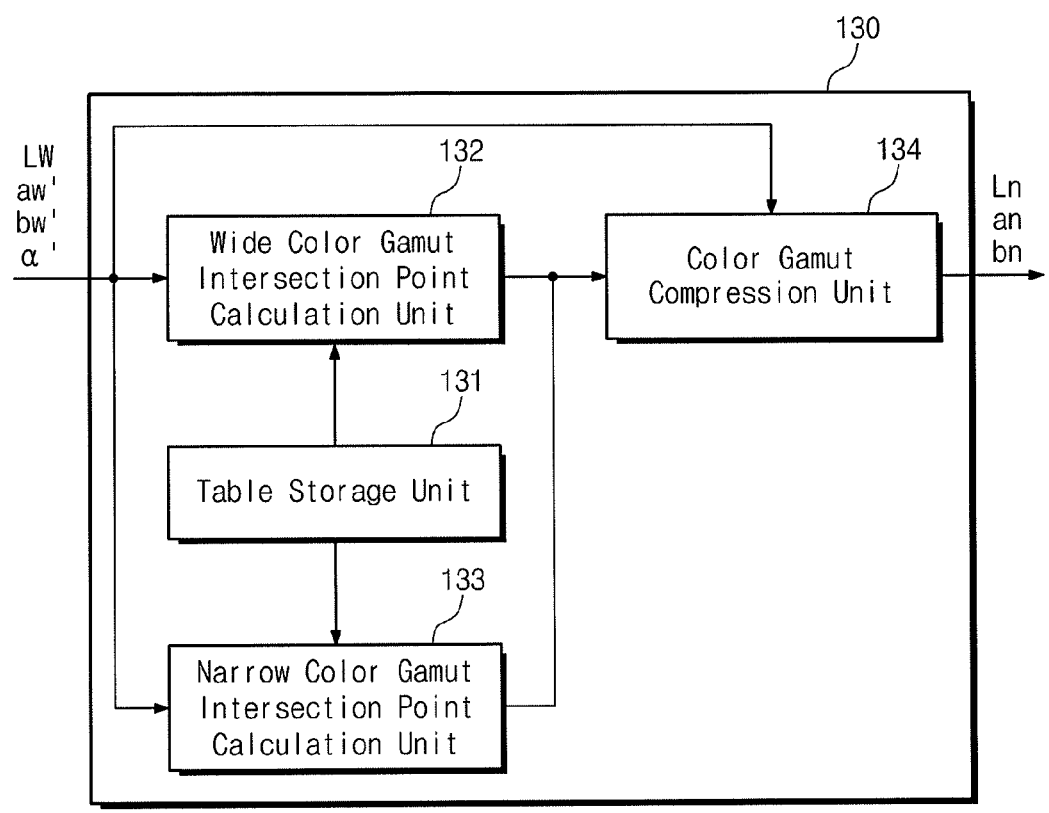
FIG. 4 illustrates a configuration of a color gamut compression unit shown in FIG. 1.

FIG. 4 is a diagram showing a configuration of the color gamut compression unit 130 shown in FIG. 1. Referring to FIG. 4, the color gamut compression unit 130 may include a table storage unit 131, a wide color gamut intersection point calculation unit 132, a narrow color gamut intersection point calculation unit 133, and a color gamut compression unit 134.

The table storage unit 131 includes a table that is used to calculate an intersection point at an L*a*b* color space. In particular, the table storage unit 131 contains a gamut boundary table of a narrow color gamut and a gamut boundary table of a wide color gamut.

The gamut boundary table of the narrow color gamut may be generated from a well-known chromaticity coordinate of a narrow color gamut. The gamut boundary table is a table that is expressed with cylindrical coordinate system of which the center is an L* axis at an L*a*b* space. An index of the table is set with the L* axis and an angle (hue angle) indicating a hue.

Coordinates (a*, b*) of a particular gamut boundary are sampled from an index value of the gamut boundary table of the narrow color gamut, and the sampled values are previously stored at the table storage unit 131 as values of the table.

The gamut boundary table of the wide color gamut may be generated substantially the same as the gamut boundary table of the narrow color gamut. However, a phase of a primary color of the narrow color gamut is different from that of the wide color gamut. Like a table stored in the table storage unit 121, boundaries of the wide color gamut and the narrow color gamut are combined using phase differences between hue angles of a primary color of a wide color gamut and hue angles of a primary color of a narrow color gamut at an L*a*b* color space. This will be described in further detail later in connection with FIGS. 8 and 9.

If a phase combination is made with respect to the primary color, a shape at a gamut boundary may vary. Thus, phase adjusting is made on an a*b* plane corresponding to L* with the L* axis as the center. A wide gamut boundary, where phases are partially combined by this processing, is sampled and a sampled value is previously stored at the table storage unit 131 as a value of the table.

The wide color gamut intersection point calculation unit 132 calculates an intersection point of a straight line, connecting any reference point L*m on the L* axis and a new input color Po formed of signals Lw, aw', and bw', and the gamut boundary of the wide color gamut, depending on signals aw' and bw' from a color fitness processing unit 122, an L* signal Lw from a color space conversion unit 113, and a hue angle α' after phase adjusting. The wide color gamut intersection point calculation unit 132 uses a gamut boundary table of a wide color gamut in the table storage unit 131 to calculate this intersection point.

Likewise, the narrow color gamut intersection point calculation unit 133 calculates an intersection point of a straight line, connecting the reference point L*m on the L* axis and the new input color Po formed of the signals Lw, aw', and bw', and the gamut boundary of the narrow color gamut, depending on the signals aw' and bw' from the color fitness processing unit 122, the L* signal Lw from the color space conversion unit 113, and the hue angle α' after phase adjusting. The narrow color gamut intersection point calculation unit 133 uses a gamut boundary table of a narrow color gamut in the table storage unit 131 to calculate this intersection point.

The color gamut compression unit 134 conducts color gamut compression for converting a color gamut from a wide color gamut to a narrow color gamut at the L*a*b* color space. In particular, the color gamut compression unit 134 converts an input color Po formed of signals Lw, aw', and bw' into a point on a straight line (L*m–Po) in a narrow color gamut by means of the intersection point calculated by the wide color gamut intersection point calculation unit 132 and the intersection point calculated by the narrow color gamut intersection point calculation unit 133, thereby making conversion into a new color Pr (=Ln, an, bn) possible. The color gamut compression unit 134 provides a post-processing unit 140 with the color Pr (=Ln, an, bn) after conversion. This will be described in further detail below in connection with FIGS. 14 to 16.

Figure 5:
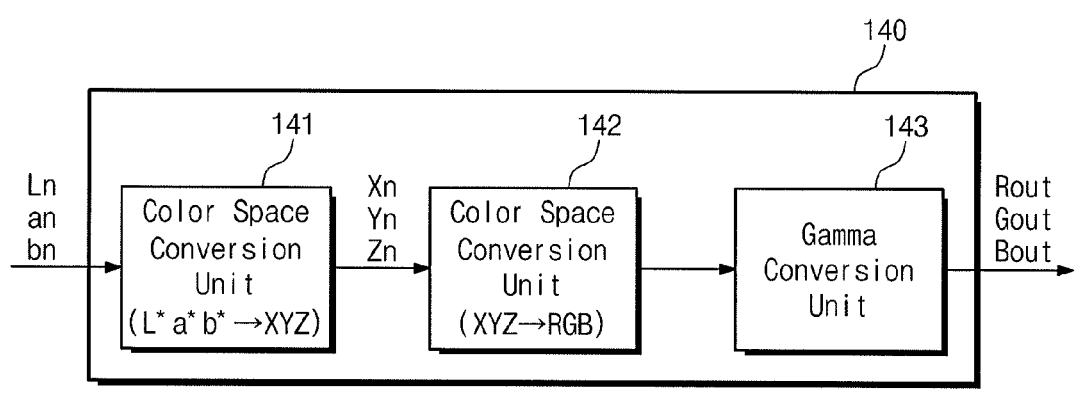
FIG. 5 illustrates a configuration of a post-processing unit shown in FIG. 1.

FIG. 5 is a diagram showing a configuration of the post-processing unit shown in FIG. 1. Referring to FIG. 5, the post-processing unit 140 contains color space conversion units 141 and 142, and a gamma conversion unit 143.

The color space conversion unit 141 converts a color space of a color Pr (=Ln, an, bn), converted into a color of a narrow color gamut by a color gamut compression unit 134, from an L*a*b* color space to an XYZ color space. The color space conversion unit 141 provides the color space conversion unit 142 with signals Xn, Yn, and Zn converted into the XYZ color space.

The color space conversion unit 142 converts the signals Xn, Yn, and Zn, converted into the XYZ color space by the color space conversion unit 141, into an RGB color space. The color space conversion unit 142 provides the gamma conversion unit 143 with image data converted into the RGB color space.

The gamma conversion unit 143 performs gamma conversion about image data converted into the RGB color space. In particular, the gamma conversion unit 143 raises (1.0/2.2) to the second power with respect to image data provided from the color space conversion unit 142. The gamma conversion unit 143 raises (1.0/2.2) to the second power with respect to the provided image data to generate signals Rout, Gout, and Bout having a gamma curve.

An image processing device 100 according to an embodiment includes components described with reference to FIGS. 1 through 5. Thus, the image processing device 100 compresses a color gamut of image data received according to the hue-preserving and gamut-compressing manner and reduces a shift or deviation of a hue at a primary color and a neighborhood of the primary color due to gamut compression.

Figure 6:
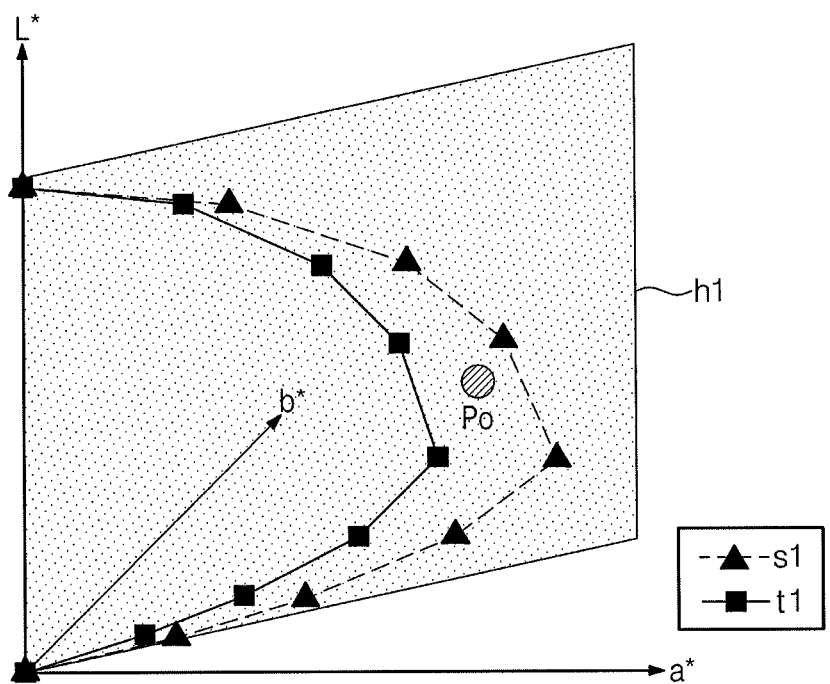
FIG. 6 illustrates a diagram for describing compressing of a color gamut by a hue-preserving and gamut-compressing manner in an L*a*b* color space.
Figure 7:
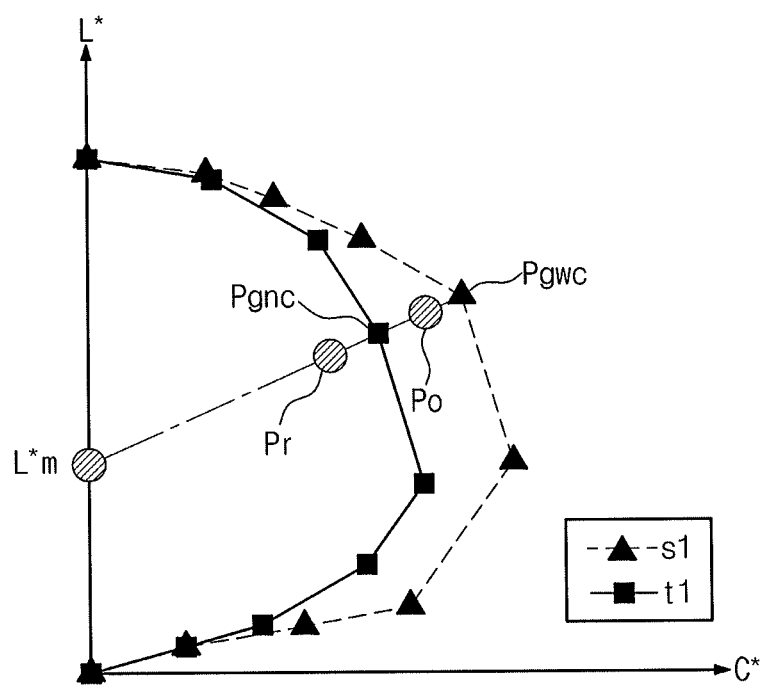
FIG. 7 illustrates a diagram showing a two-dimensional plane (L*C* color space) about the same hue plane marked by symbol h1 in an L*a*b* shown in FIG. 6.

FIG. 6 is a diagram for describing compressing of a color gamut by a hue-preserving and gamut-compressing manner in an L*a*b* color space. FIG. 7 is a diagram showing a two-dimensional plane (L*C* color space) about the same hue plane marked by symbol h1 in an L*a*b* shown in FIG. 6. FIGS. 6 and 7 are provided as a comparative example to image processing according to embodiments.

In FIG. 6, reference symbol h1 indicates the same hue plane of an L*a*b* color space. Reference symbol s1 indicates a gamut boundary of an input wide color gamut on a hue plane indicated by the reference symbol h1. Reference symbol t1 indicates a gamut boundary of a target color gamut, that is, a narrow color gamut on a hue plane indicated by the reference symbol h1. Reference symbol Po indicates an input color of a wide color gamut on a hue plane indicated by the reference symbol h1. Thus, a hue plane indicated by the reference symbol h1 is a plane that is formed of an L* axis and the input color Po.

Referring to FIGS. 6 and 7, a reference point L*m on the L* axis is determined. The reference point L*m, for example, may have the same L value as the input color Po or the center of a gamut boundary of a narrow color gamut or may be determined by any other criterion. A color Pr after compression is determined at any position on a straight line passing the reference point L*m and the input color Po in the narrow color gamut. This corresponds to color conversing by a hue-preserving and gamut-compressing manner.

In FIG. 7, "Pgnc" and "Pgwc" indicate intersection points between the straight line (L*m–Po) and a gamut boundary of a narrow color gamut and between the straight line (L*m–Po) and a gamut boundary of a wide color gamut. In this case, the color Pr after color gamut compression is determined to satisfy the following: (length of a segment L*m–Po/length of a segment L*m–Pgwc)=(length of a segment L*m–Pr/length of a segment L*m–Pgnc).

As described above, a hue-preserving and gamut-compressing manner compresses a color gamut with a hue preserved. In this hue-preserving and gamut-compressing manner, however, since the hue is first preserved and then a color gamut is compressed, a primary color is not maintained before and after conversion. In contrast, as described in detail below, embodiments may compress a color gamut of image data received according to the hue-preserving and gamut-compressing manner of FIGS. 6 and 7, but in which a shift or deviation of a hue at a primary color and a neighborhood of the primary color due to gamut compression may be reduced.

Figure 8:
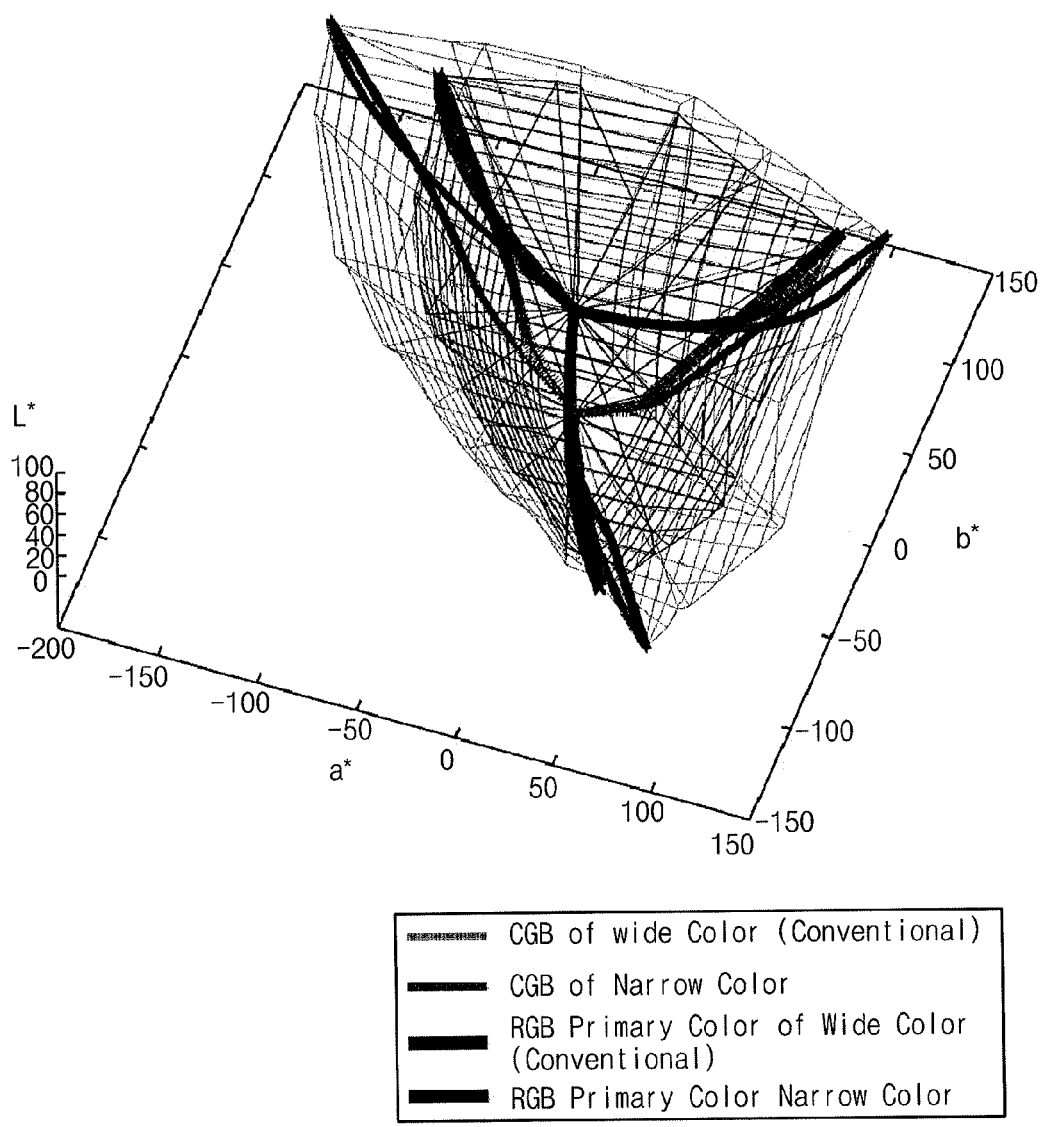
FIG. 8 illustrates a diagram for describing a difference between a gamut boundary of a wide color gamut and a gamut boundary of a narrow color gamut.

FIG. 8 is a diagram for describing a difference between a gamut boundary of a wide color gamut and a gamut boundary of a narrow color gamut. Referring to FIG. 8, a deviation about a boundary of a primary color exists at a narrow color gamut and a wide color gamut. Thus, if color conversion is made with a hue preserved, a primary color is not maintained before and after conversion. However, if a primary color is maintained, a hue may not be maintained. In an embodiment, the following method is provided to satisfy the two conflicting conditions.

Before converting a color using a hue-preserving and gamut-compressing manner, an image processing device 100 according to an embodiment calculates how much a primary color of a gamut boundary of a wide color gamut deviates with respect to a primary color of a gamut boundary of a narrow color gamut, as a phase difference on an a*b* plane of which the center is an L* axis.

A deviation of a primary color is calculated with respect to each L value, by calculating how much a primary color of a gamut boundary of a wide color gamut deviates with respect to a primary color of a gamut boundary of a narrow color gamut.

Thus, an image processing device 100 conducts phase combination about a primary color between the narrow color gamut and the wide color gamut, by rotating a gamut boundary of the wide color gamut gently with the L* axis as the center at a neighborhood of a primary color of the wide color gamut.

Figure 9:
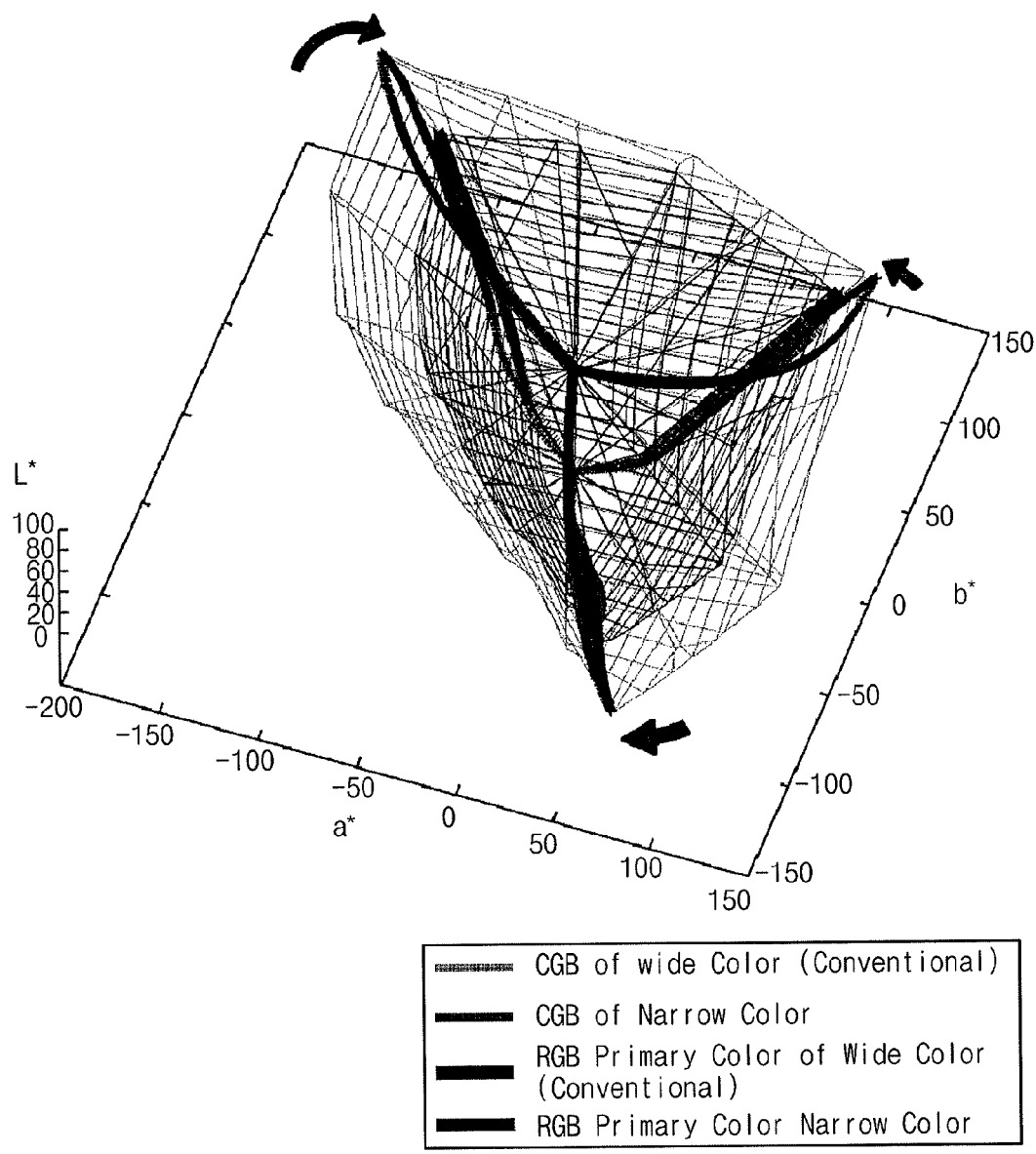
FIG. 9 illustrates a diagram for describing phase combination about a primary color between a narrow color gamut and a wide color gamut.

FIG. 9 is a diagram for describing phase combination about a primary color between a narrow color gamut and a wide color gamut. Referring to FIG. 9, a deviation of a primary color is reduced at a neighborhood of the primary color by performing phase combination about the primary color between a narrow color gamut and a wide color gamut. In other words, when the deviation between the primary color of a gamut boundary of a wide color gamut and a primary color of a gamut boundary of a narrow color gamut exceeds a predetermined amount, the wide color gamut and/or narrow color gamut may be rotated relative to one another to reduce the deviation.

When an input color Po is adjacent to the primary color, an image processing device 100 rotates the input color Po with the L* axis as the center. The image processing device 100 applies the above-described hue-preserving and gamut-compressing manner to the input color Po that experiences rotation with respect to a gamut boundary of the wide color gamut where a phase is combined with a primary color of a narrow color gamut.

Thus, the image processing device 100 reduce a deviation of a primary color at a neighborhood of the primary color and performs color conversion where a hue is maintained in the remaining space other than the neighborhood of the primary color.

Figure 10:
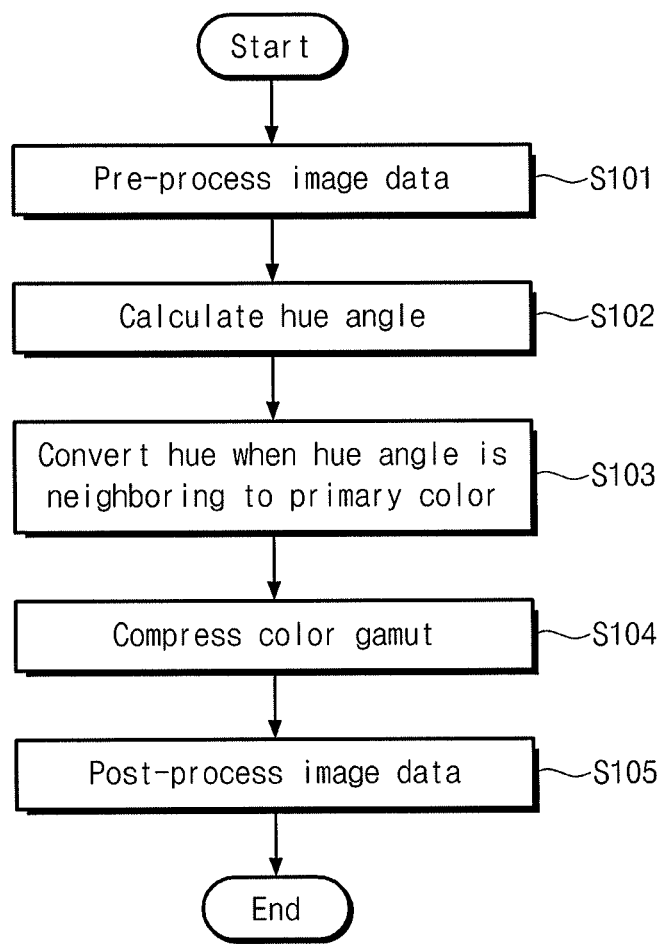
FIG. 10 illustrates a flow chart for describing an operation according to an embodiment.

FIG. 10 is a flow chart for describing an operation of an image processing device according to an embodiment. Referring to FIG. 10, in operation S101, an image processing device 100 pre-processes input image data of a wide color gamut. The pre-processing is performed by the pre-processing unit 110.

As described above, the pre-processing performed by the pre-processing unit 110 may include the following: inverse gamma conversion of the inverse gamma conversion unit 111, converting from an RGB color space to an XYZ color space through the color space conversion unit 112, and converting from the XYZ color space to an L*a*b* color space through the color space conversion unit 113.

In operation S102, after pre-processing the image data of the wide color gamut, the image processing device 100 calculates a hue angle of the input image data of the wide color gamut. The hue angle is calculated by the hue angle calculation unit 114. As described above, the hue angle calculation unit 114 obtains the hue angle using the equation α=a tan 2(b*, a*).

After calculating a hue angle of the input image data of the wide color gamut, in operation S103, the image processing device 100 conducts phase adjusting for converting a hue of the input image data when the hue angle is a hue angle adjacent to a primary color. The phase adjusting is performed by the color fitness processing unit 122.

The color fitness processing unit 122 conducts phase adjusting about a* and b* signals aw and bw from the color space conversion unit 113 by means of the hue angle α of the image data from the hue angle calculation unit 114 and data from a table in the table storage unit 121.

Figure 11:
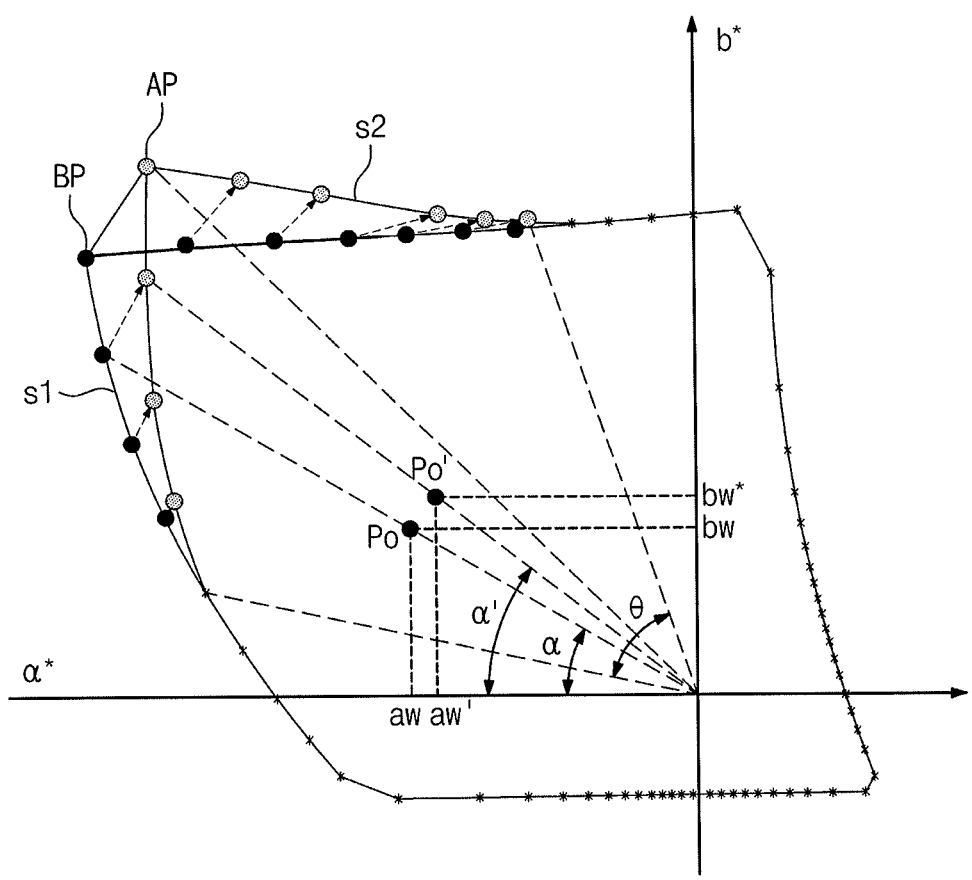
FIG. 11 illustrates a diagram for describing phase adjusting of a color fitness processing unit.

Below, the phase adjusting will be more fully described in FIG. 11 is a diagram for describing phase adjusting of a color fitness processing unit. FIG. 11 illustrates an embodiment where, in an L*a*b* color space, one point on any L* axis is extracted from an a*b* plane.

In FIG. 11, reference symbol BP indicates a position on the a*b* plane of a primary color before phase adjusting is performed. Reference symbol AP indicates a position on the a*b* plane of a primary color experiencing the phase adjusting. Reference symbol s1 indicates a gamut boundary of a wide color gamut before the phase adjusting. Reference symbol s2 indicates a gamut boundary of the wide color gamut after the phase adjusting. A hue angle α of image data from a hue angle calculation unit 114 means an angle of an input color Po.

Referring to FIG. 11, when a hue angle is adjacent to a primary color, the hue fitness processing unit 122 conducts phase adjusting about a hue of input image data, as illustrated in FIG. 11, depending on data of a table in the table storage unit 121.

Here, bending occurs at a gamut boundary of a wide color gamut when a point indicated by the reference symbol BP is moved to a point indicated by the reference symbol AP. The hue fitness processing unit 122 has a transition range θ shown in FIG. 11, and the transition range θ is adjusted such that a gamut boundary of the wide color gamut after phase adjusting gently, e.g., smoothly, varies.

Since adjusting the gamut boundary of the wide color gamut after the phase adjusting in the transition range θ, the color fitness processing unit 122 preserves the gamut boundary of the wide color gamut such that the gamut boundary of the wide color gamut gently varies after the phase adjusting.

Returning to FIG. 10, after the phase adjusting is performed, in operation S104, the image processing device 100 conducts gamut compression about the image data of the wide color gamut. The gamut compression is performed by the color gamut compression unit 130.

The color gamut compression unit 130 compresses a color gamut of a color, experiencing the phase adjusting, according to a hue-preserving and gamut-compressing manner by means of a gamut boundary of a wide color gamut and a gamut boundary of a narrow color gamut after the phase adjusting.

Below, gamut compression will be more fully described.

Figure 13:
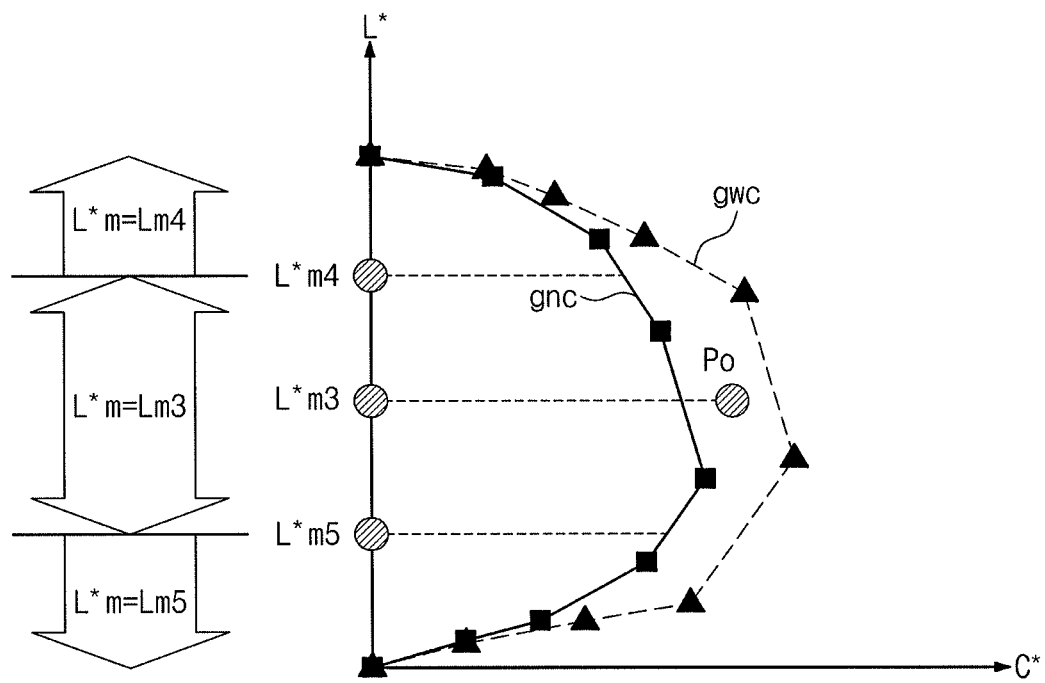
FIG. 13 illustrates a diagram for describing algorithm shown in FIG. 12.

FIG. 12 is a diagram for describing algorithm for determining a reference point on an L* axis. FIG. 13 is a diagram for describing algorithm shown in FIG. 12. In FIG. 13, "gwc" is the gamut boundary for the wide color gamut and "gnc" is the gamut boundary for the narrow color gamut.

Referring to FIGS. 12 and 13, a color gamut compression unit 130, as described above, determines a reference point L*m on an L* axis. "Max C" is algorithm that determines L*, which makes C* maximum at a gamut boundary of a narrow color gamut, as L*m on each color gamut plane.

"Average" is algorithm that determines an average value of L*ml (on all color gamut planes) obtained every color gamut plane. "Max C" and "Average" are fixed values that is determined only using a gamut boundary regardless of a value of L* of an input color Po.

"Horizontal1" is algorithm that determines a value of the same L* as the input color Po as L*m.

"Horizontal2" is algorithm that determines L*m3 or L*m4 shown in FIG. 13 as L*m. According to this algorithm, a value of L* of the input color Po, that is, L*m3 is determined as L*m when a value of L* of the input color Po is less than L*m4, and L*m4 is determined as L*m when a value of L* of the input color Po is greater than or equal to L*m4.

"Horizontal3" is algorithm that determines L*m3, L*m4 or L*m5 shown in FIG. 13 as L*m. According to this algorithm, L*m5 is determined as L*m when a value of L* of the input color Po is greater than or equal to 0, L*m3 is determined as L*m when a value of L* of the input color Po is greater than L*m5 and less than or equal to L*m4, and L*m4 is determined as L*m when a value of L* of the input color Po is greater than or equal to L*m4.

In FIG. 12, five algorithms are exemplified. However, the scope and spirit of the disclosure may not be limited thereto. For example, L*m may be determined by algorithms different from the five algorithms.

The color gamut compression unit 130 compresses a color gamut using L*m that determined as described above. In exemplary embodiments, a color gamut may be compressed using an intersection point of a straight line, connecting a reference point L*m determined on an L* axis and an input color Po, and a gamut boundary between a wide color gamut and a narrow color gamut.

The wide color gamut intersection point calculation unit 132 calculates an intersection point of a straight line, connecting a reference point L*m on the L* axis and a new input color Po' formed of signals Lw, aw', and bw', and a gamut boundary of the wide color gamut, as shown in FIG. 11.

The narrow color gamut intersection point calculation unit 133 calculates an intersection point of a straight line, connecting a reference point L*m on the L* axis and the new input color Po' formed of signals Lw, aw', and bw', and a gamut boundary of the narrow color gamut.

The color gamut compression unit 134 performs gamut compression to convert a color gamut from the wide color gamut to the narrow color gamut in an L*a*b* color space.

Upon compressing of a color gamut, the color gamut compression unit 134 may convert a color gamut from the wide color gamut to the narrow color gamut in the L*a*b* color space while maintaining a ratio of a distance between the reference point L*m and the input color Po to a distance between the reference point L*m and an intersection point with a gamut boundary of the wide color gamut.

However, a color gamut is not converted from the wide color gamut to the narrow color gamut in the L*a*b* color space only with the ratio maintained. A color gamut is compressed in an inward direction of a gamut boundary of the narrow color gamut at a gamut boundary of the wide color gamut, and a color inside the gamut boundary of the narrow color gamut maintains the wide color gamut without modification. This will be more fully described below.

Figure 14:
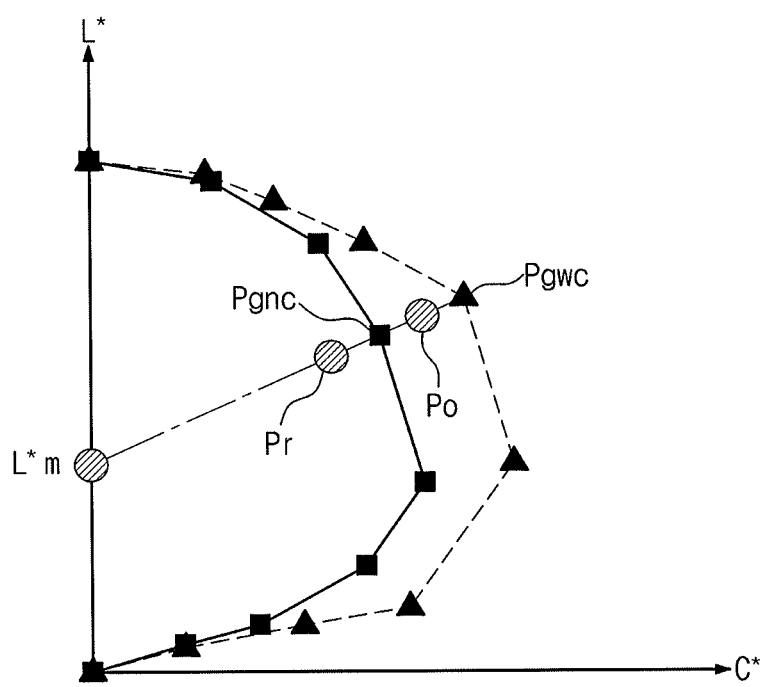
FIG. 14 illustrates a diagram for describing a relationship among a reference point on a hue plane, an input color, and an output color after compression.
Figure 15:
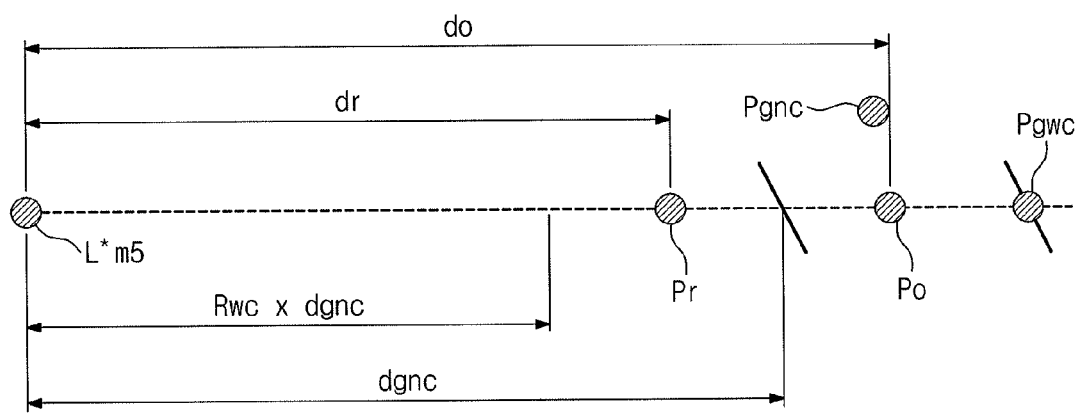
FIG. 15 illustrates a diagram for describing a straight line connecting a reference point and an input color on an L*a*b* plane shown in FIG. 14.

FIG. 14 is a diagram for describing a relationship among a reference point on a hue plane, an input color, and an output color after compression. FIG. 15 is a diagram for describing a straight line connecting a reference point and an input color on an L*a*b* plane shown in FIG. 14.

Referring to FIGS. 14 and 15, "Pgwc" is an intersection point of a straight line, connecting a reference point L*m and an input color Po, and a gamut boundary of a wide color gamut. "Pgnc" is an intersection point of a straight line, connecting the reference point L*m and the input color Po, and a gamut boundary of a narrow color gamut.

It is assumed that "do", "dr", and "dgnc", are defined as illustrated in FIG. 15 and "Rwc" is a maintenance rate of a wide color gamut (or, Rwc=dr/do). In FIG. 15, do is the distance along the straight line from the reference point L*m5 to an input color Po, dr is a distance the straight line from the reference point L*m5 to the output color Pr, and dgnc is the distance along the straight line from the reference point L*m5 to the gamut boundary of the narrow color gamut. When do=Rwc×dgnc, a color gamut compression unit 134 sets "dr" to be identical to "do". Otherwise, the color gamut compression unit 134 is obtained as follows.

Figure 16:
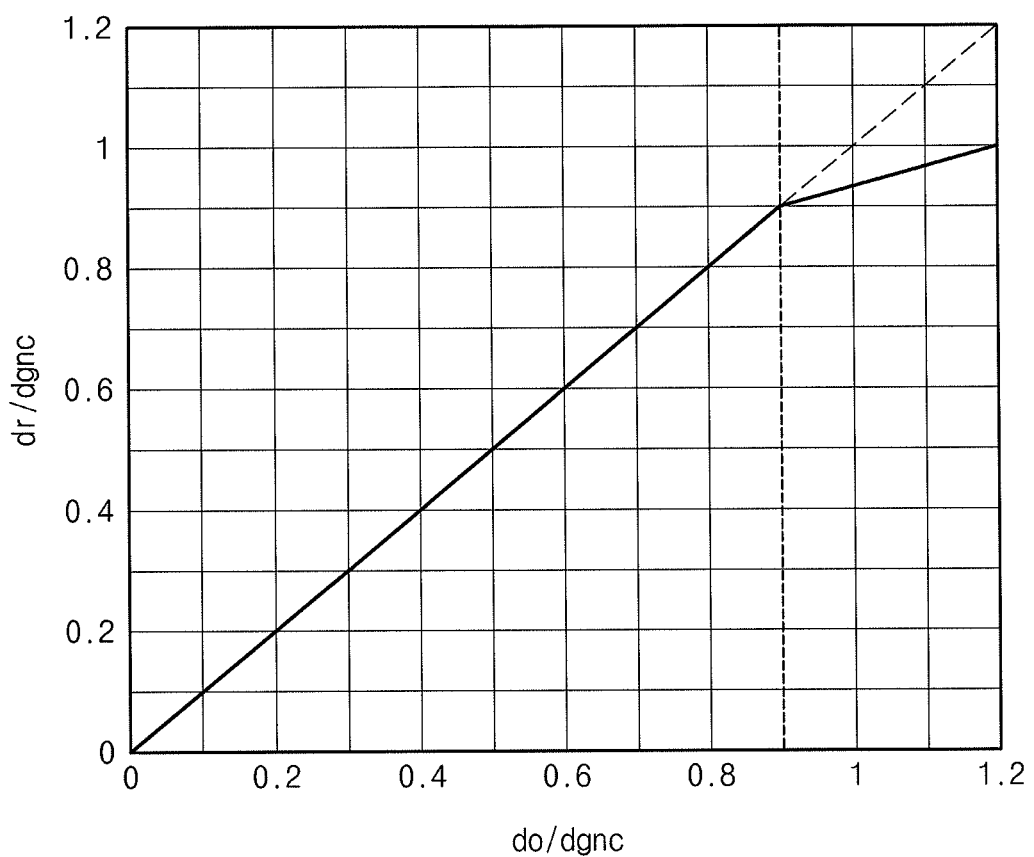
FIG. 16 illustrates a diagram for describing gamut compression of a color gamut compression unit.

FIG. 16 is a diagram for describing gamut compression of the color gamut compression unit 134.

Referring to FIG. 16, the color gamut compression unit 134 sets "dr" to be identical to "do" (i.e., a constant slope of one) in a first section where do/dgnc ranges from 0 to 0.9. In a section where do/dgnc ranges from 0.9 to 1.2, the color gamut compression unit 134 determines "dr" depending on the equation and outputs an output color Pr after gamut compression.

However, gamut compression and an output of the output color Pr after gamut compression may be made using algorithms different from the above-described algorithms.

Returning to FIG. 10, after compressing a color gamut, in operation S105, an image processing device 100 post-processes image data experiencing gamut compression. The post-processing is performed by a post-processing unit 140.

Operations after the post-processing is performed by the post-processing unit 140, as described above, include the following: converting from an L*a*b* color space to an XYZ color space through the color space conversion unit 141, converting from the XYZ color space to an RGB color space using the color space conversion unit 142, and gamma converting using the gamma conversion unit 143.

An image processing device 100 according to an embodiment preserves a hue and reduces a deviation of a hue at a primary color in a neighborhood of the primary color due to gamut compression while compressing a color gamut of image data according to a hue-preserving and gamut-compressing manner.

As described above, to reduce a deviation of a hue at a primary color and a neighborhood of the primary color due to gamut compression upon compressing a color gamut of image data according to the hue-preserving and gamut-compressing manner, the image processing device 100 according to an embodiment combines a phase of a gamut boundary of a wide color gamut with a phase of a gamut boundary of a narrow color gamut at a primary color and a neighborhood of the primary color before a color gamut is compressed.

The image processing device 100 according to an embodiment combines a phase of a gamut boundary of a wide color gamut with a phase of a gamut boundary of a narrow color gamut at a primary color and a neighborhood of the primary color, thereby reducing a deviation of a hue at a primary color and a neighborhood of the primary color due to gamut compression upon compressing a color gamut of image data according to the hue-preserving and gamut-compressing manner.

An operation of the image processing device 100 may be made with a computer program through hardware (not shown) such as a central processing unit, a ROM, and a RAM embedded in the image processing device 100. The image processing device 100 may include a storage medium for storing the computer program.

The methods and processes described herein may be performed by code or instructions to be executed by a computer, processor, manager, or controller. Because the algorithms that form the basis of the methods (or operations of the computer, processor, or controller) are described in detail, the code or instructions for implementing the operations of the method embodiments may transform the computer, processor, or controller into a special-purpose processor for performing the methods described herein.

Also, another embodiment may include a computer-readable medium, e.g., a non-transitory computer-readable medium, for storing the code or instructions described above. The computer-readable medium may be a volatile or non-volatile memory or other storage device, which may be removably or fixedly coupled to the computer, processor, or controller which is to execute the code or instructions for performing the method embodiments described herein.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image processing device, comprising:
a hue changer to change a hue of input image data from a first hue to a second hue by adjusting a hue angle of the input image data according to a phase difference between primary colors in first and second color gamuts, the first and second color gamuts having different color ranges from each other when the input image data is at or adjacent to the primary color in the first color gamut; and a color gamut converter to preserve a hue of image data from the hue changer and to convert a color gamut of the image data from the hue changer from the first color gamut to the second color gamut.

2. The image processing device as claimed in claim 1, wherein the hue changer changes the hue of the input image data by adjusting the hue angle of the input image data according to the phase difference between the primary colors in first and second color gamuts when a hue angle of an input color of the input image data is at or adjacent to a hue angle of a primary color in a first color range of the first color gamut.

3. The image processing device as claimed in claim 2, wherein the color gamut converter converts the color gamut of the image data from the hue changer depending on first information about a boundary area of the first color gamut and second information about a boundary area of the second color gamut.

4. The image processing device as claimed in claim 3, wherein the color gamut converter converts the color gamut in accordance with a line that connects a reference point and a point of the image data from the hue changer and with intersection points of the line with a boundary area of the first color gamut and a boundary area of the second color gamut.

5. The image processing device as claimed in claim 1, further comprising:

a color space converter to convert input image data in a first color space to input image data in a second color space.

6. The image processing device as claimed in claim 5, wherein the first color space is an RGB color space.

7. The image processing device as claimed in claim 5, wherein the second color space is a LAB color space.

8. The image processing device as claimed in claim 5, further comprising:

a color space re-converter to convert image data output from the color gamut converter from the second color space to the first color space.

9. The image processing device as claimed in claim 1, wherein the color gamut converter preserves the hue of the image data from the hue changer and converts the color gamut of the image data from the hue changer from the first color gamut to the second color gamut by performing phase combination associated with the primary colors in the first and second color gamuts according to the phase difference between the primary colors in the first and second color gamuts.

10. The image processing device as claimed in claim 9, wherein the phase combination associated with the primary colors in the first and second color gamuts is performed by combining gamut boundaries of the first and second color gamuts according to the phase difference between the primary colors in the first and second color gamuts.

11. An image processing method using an image processing device, comprising:

changing a hue of input image data from a first hue to a second hue by adjusting a hue angle of the input image data according to a phase difference between primary colors in first and second color gamuts, the first and second color gamuts having different color ranges from each other when the input image data is at or adjacent to the primary color in the first color gamut using a hue changer; and preserving a hue of the hue changed image data and converting a color gamut of the hue changed image data from the first color gamut to the second color gamut using a color gamut converter.

12. An image processing method as claimed in claim 11, wherein preserving the hue of the hue changed image data and converting the color gamut of the hue changed image data includes performing phase combination associated with the primary colors in the first and second color gamuts according to the phase difference between the primary colors in the first and second color gamuts.

13. An image processing method as claimed in claim 12, wherein performing phase combination associated with the primary colors in the first and second color gamuts includes combining gamut boundaries of the first and second color gamuts according to the phase difference between the primary colors in the first and second color gamuts.

* * * * *